US006987489B2

(12) United States Patent
Melconian et al.

(10) Patent No.: US 6,987,489 B2
(45) Date of Patent: Jan. 17, 2006

(54) ELECTRONICALLY SCANNING DIRECTION FINDING ANTENNA SYSTEM

(75) Inventors: Arsen Melconian, Thousand Oaks, CA (US); David Steward, Thousand Oaks, CA (US); Gregory Lackmeyer, Thousand Oaks, CA (US); John Longyear, Thousand Oaks, CA (US); Paul Crane, Thousand Oaks, CA (US)

(73) Assignee: Tecom Industries, Inc., Thousand Oaks, CA (US)

( * ) Notice: Subject to any disclaimer, the term of this patent is extended or adjusted under 35 U.S.C. 154(b) by 19 days.

(21) Appl. No.: 10/826,442

(22) Filed: Apr. 15, 2004

(65) Prior Publication Data

US 2004/0246191 A1 Dec. 9, 2004

Related U.S. Application Data

(60) Provisional application No. 60/463,168, filed on Apr. 15, 2003.

(51) Int. Cl.
*H01Q 13/00* (2006.01)
*H01Q 19/17* (2006.01)

(52) U.S. Cl. ...................... 343/779; 343/742; 343/867; 343/701; 343/797; 343/772; 343/835; 343/824; 343/836; 343/781 P; 343/891

(58) Field of Classification Search ................ 343/779, 343/836, 797, 742, 867, 701, 781 P, 891, 343/840, 853, 781 CA, 837
See application file for complete search history.

(56) References Cited

U.S. PATENT DOCUMENTS

| | | | | |
|---|---|---|---|---|
| 3,226,658 | A * | 12/1965 | Bowman | 333/1 |
| 4,825,222 | A * | 4/1989 | Butcher | 343/836 |
| 5,389,941 | A * | 2/1995 | Yu | 343/797 |
| 6,127,987 | A * | 10/2000 | Maruyama et al. | 343/835 |
| 6,317,095 | B1 * | 11/2001 | Teshirogi et al. | 343/785 |
| 6,329,957 | B1 * | 12/2001 | Shea et al. | 343/756 |
| 2004/0227682 | A1 * | 11/2004 | Anderson | 343/742 |

* cited by examiner

*Primary Examiner*—Don Wong
*Assistant Examiner*—Chuc Tran
(74) *Attorney, Agent, or Firm*—K. David Crockett, Esq.; Crockett & Crockett

(57) ABSTRACT

An electronic scanning radio direction finding system for accurate direction finding of radio frequency signals using singly or doubly flared cylindrical reflectors surrounded by a circular array of inwardly facing feed horns. The array is operated as a phased array to determine the direction of origin of received signals. The feed horns can also be used to transmit RF signals on very narrowly controlled beams with minimal side lobes. The flared cylindrical reflector and its circular feed horn array may be paired with circular log periodic arrays operable at similar frequency ranges or different frequency ranges to provide more precise direction finding and direction finding of signals at frequencies beyond the range of the flared cylindrical reflector and its circular feed horn array.

30 Claims, 10 Drawing Sheets

Point Focus Feed

Line Focus Feed

ELECTRONICALLY SCANNING DIRECTION FINDING ANTENNA SYSTEM

This application claims the benefit of U.S. Provisional Application No. 60/463,168, filed Apr. 15, 2003.

FIELD OF THE INVENTIONS

The inventions described below relate the field of radio frequency direction finding.

BACKGROUND OF THE INVENTIONS

Radio frequency direction finding antenna systems are useful in a number of applications which require accurate determination of the direction from which a radio transmission originates. Communication systems that depend on mobile transmitters or receivers, or satellites, use direction finding to determine proper orientation of a receiving antenna. Surveillance, intelligence, and military targeting systems are primarily concerned with accurate location of a radio frequency source.

The most prevalent radio direction finding systems include a paraboloid off-set antenna which comprises a reflector having the shape of a parabolic section, a feed horn fixed at the focal point of the reflector, a motor for rotating the reflector and feed horn together as a unit (and position indicators for communicating the exact orientation of the reflector and feed horn), and associated electronics for controlling the motor, processing received signals, and generating an output indicating the direction of a radio frequency signal of interest. While the reflector and feed horn are rotated together, associated signal processing systems analyze detected RF signals to determine the direction from which RF signals of interest originate. The direction of a received signal is determined by comparing the position information of the antenna and feed horn with the peak beam strength of the incoming signal.

Non-rotating direction finding antenna systems have been proposed, and these operate as phased arrays. These systems comprise a number of antennae located in fixed relationship to each other, and associated electronics for processing received signals, and generating an output indicating the direction of a radio frequency signal of interest. These systems entail relatively large arrays, and are generally planar, and provide coverage over limited spans.

SUMMARY

The systems and methods disclosed below provide for accurate direction finding of radio frequency signals without moving parts. The resolution of the system is 0.08 degrees. The system operates on a broad frequency range of 0.4 to 50 gigahertz, with a gain of 10 to 20 dBi, depending on the frequency. The system comprises a central, outwardly convex (in the horizontal or azimuth plane) cylindrical reflector which is surrounded by a circular array of inwardly facing feed horns. The reflector is preferably outwardly concave in the elevational plane, and its shape approximates a surface of revolution of parabolic sections about the axis perpendicular to the beam plane, forming a flared cylinder.

The array of feed horns comprises feed horns fixed at the focal points of the cylindrical reflector, or the focal plane of the flared cylindrical reflector, thus forming a ring of feed horns surrounding the flared cylindrical reflector, directed inwardly toward the flared cylindrical reflector. The feed horns are adapted to operate with the system as broadband receivers. The array is operated as a phased array, and associated electronics, signal processors and computers are used to analyze the signals received at each feed horn to determine the direction of origin of received signals. The feed horns can also be used to transmit RF signals on very narrowly controlled beams with minimal side lobes.

The flared cylindrical reflector and its circular feed horn array may be paired with circular log periodic arrays operable at similar frequency ranges or different frequency ranges to provide more precise direction finding and direction finding of signals at frequencies beyond the range of the flared cylindrical reflector and its circular feed horn array.

DETAILED DESCRIPTION OF THE INVENTIONS

Figure 1:
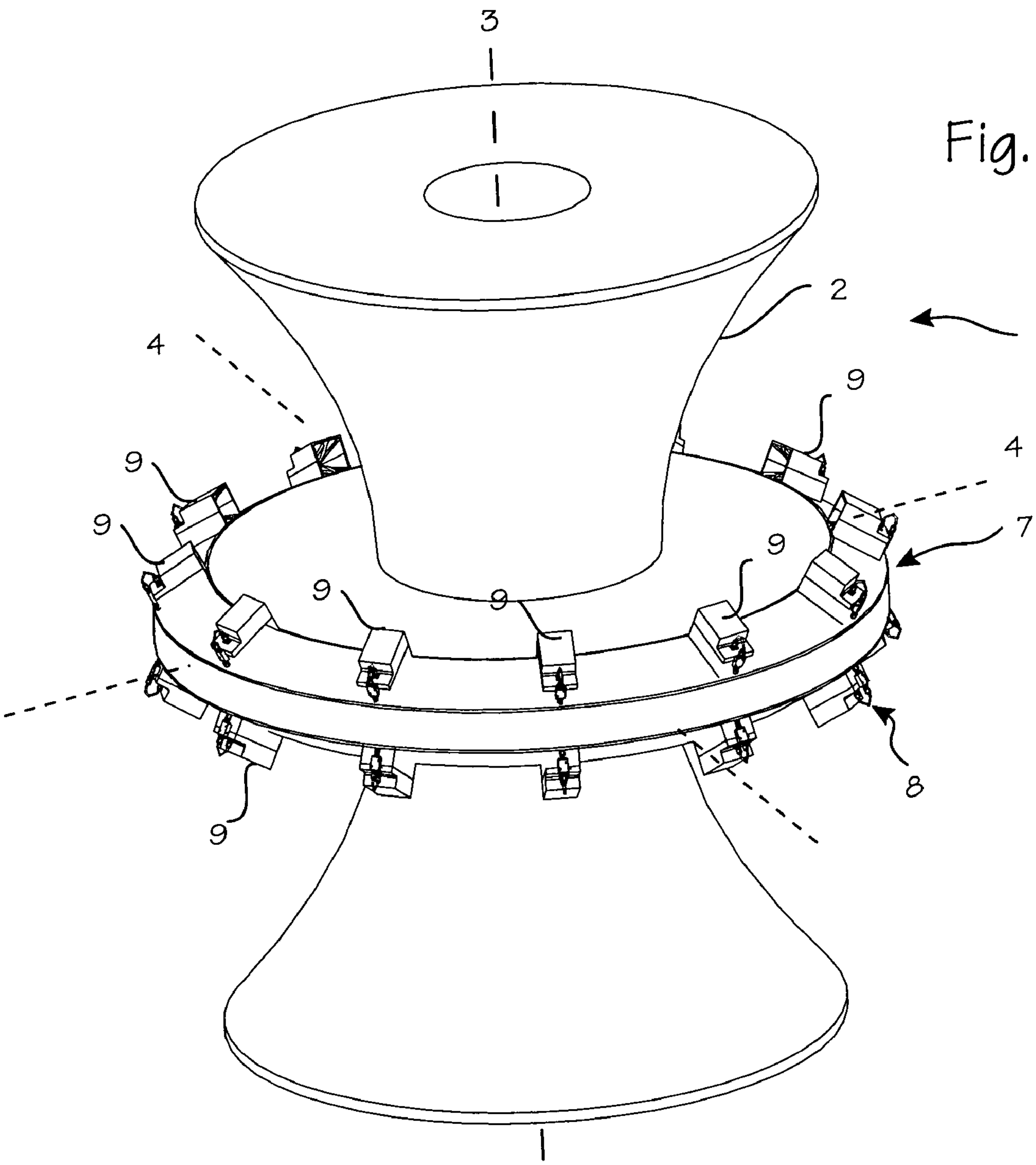
FIG. 1 shows the reflector and feed array of the direction finding antenna system.

FIG. 1 shows the direction finding system 1. In this embodiment, the reflector 2 comprises a reflector surface, the shape of which may variously be referred to as a flared cylinder, a truncated hour-glass shape, an apple-core shape, a flared spool, or trumpet-shaped. The reflector is preferably outwardly concave in the elevational plane, and its shape approximates a surface of revolution of parabolic sections about the axis perpendicular to the beam plane, forming a flared cylinder. In rough mathematical terms, the shape may be substantially described as a paraboloid of revolution, a hyperboloid of revolution, a catenoid (though it is not necessarily a mathematically true catenoid), or apex-opposed psuedospheres (though it is not necessarily a mathematically true psuedosphere). The reflector shape establishes an elevational axis 3 corresponding to the longitudinal axis of the cylinder (which in use will typically correspond to the vertical) and an azimuth plane 4 (which in use will typically correspond to the horizontal). For convenience in describing additional embodiments used in different orientations, the term "beam plane" is used to refer to the main orientation of the signal localization, or the orientation of the major lobe of signals received and transmitted or reflected from the reflector, which in the case of FIG. 1 is parallel to the azimuth and horizontal plane.

For optimum direction finding in the azimuth or beam plane, the reflector shape approximates a paraboloid of revolution (or two paraboloid sections of revolution arranged apex-to-apex), and is modified from the ideal paraboloid of revolution as described below. When constructed as a full surface of revolution, the reflector may be used to obtain full 360° coverage, but for applications requiring smaller azimuth coverage, the reflector can be provided in a half-pipe configuration, as a surface of revolution which subtends 90°, 180° (see FIG. 7), or arbitrary arcs. For applications requiring above-the-horizon and below-the-horizon coverage, the full height reflector of FIG. 1 is used. For applications requiring only above the horizon or below the horizon direction finding, only the upper or lower portion of the reflector is provided, as illustrated in the reflector 5 shown FIG. 2. For applications requiring or permitting less that full 360° coverage, the half-pipe, half-height reflector 6 of FIG. 3 may be used, and the circular extent of the reflector may be limited as required in particular applications. Thus the reflector full or partial cylinder (a cylindrical section), and may be flared one or both ends, as desired for use in various configurations of the ESDF.

In the horizontal cross section, the outer surface of the reflector is preferably circular, or substantially so, along the height of the reflector. The reflector is about 24 inches high, and 36 inches in maximum diameter, though the size of the reflector may be varied to suit the application. The reflector may be made of foam, coated with metal, and may be hollow to allow mounting on masts and to permit installation of the various electronic components within the reflector to provide a lower profile.

Figure 2:
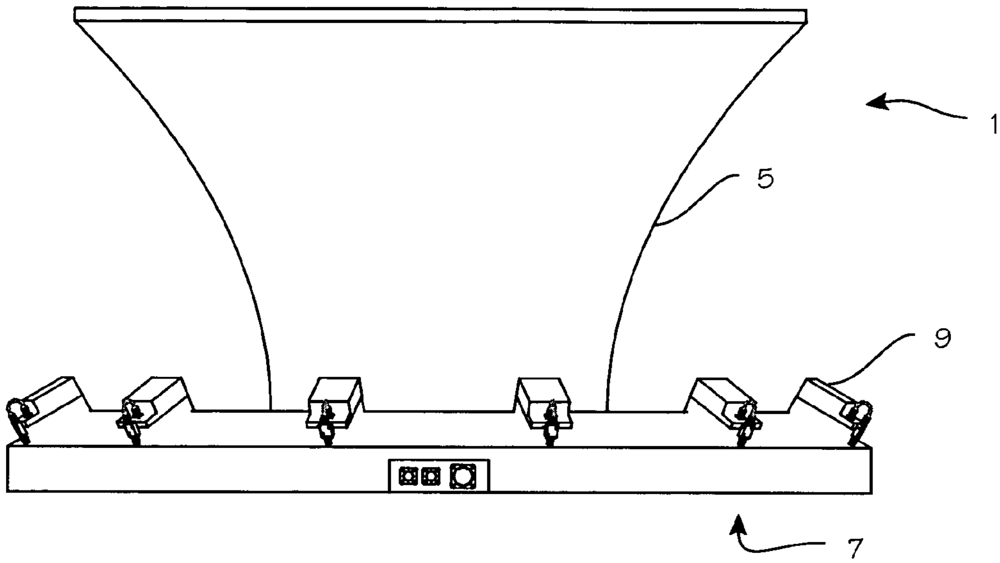
FIG. 2 shows the reflector and feed array of the direction finding antenna system, adapted to provide above-the-horizon coverage.
Figure 3:
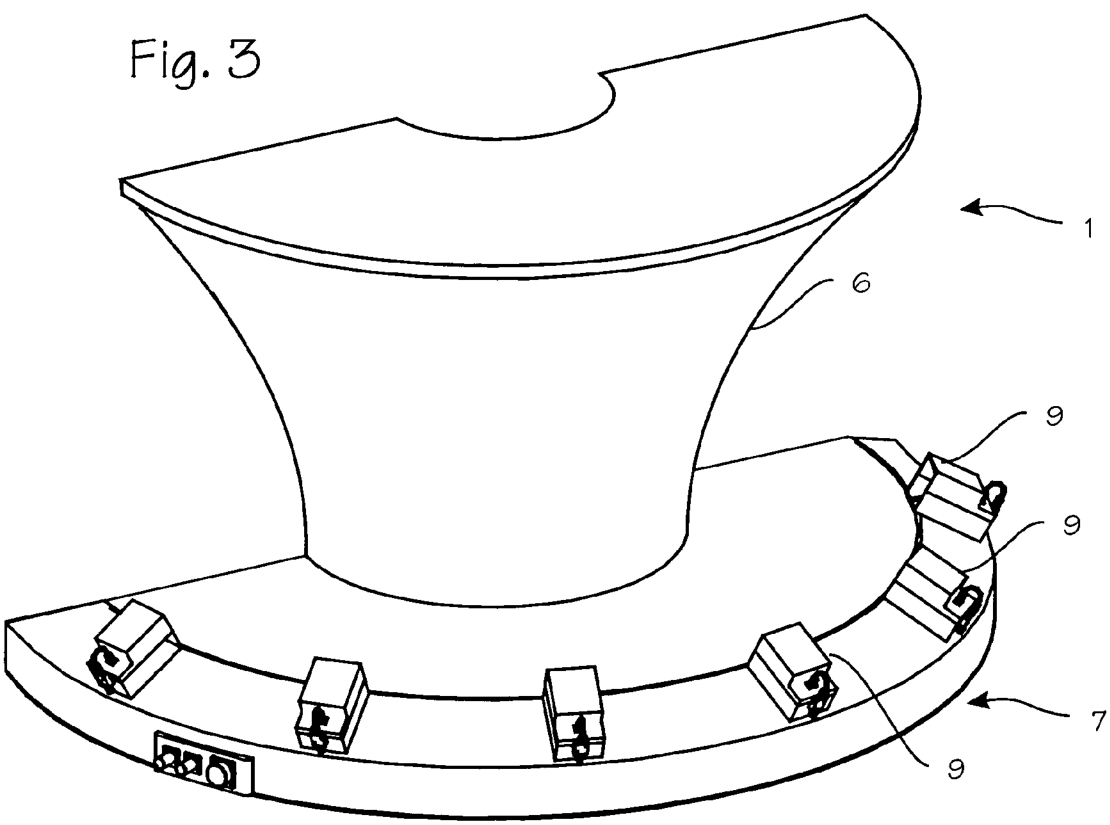
FIG. 3 shows the reflector and feed array of the direction finding antenna system, adapted to provide above-the-horizon coverage over 180° of azimuth.
Figure 7:
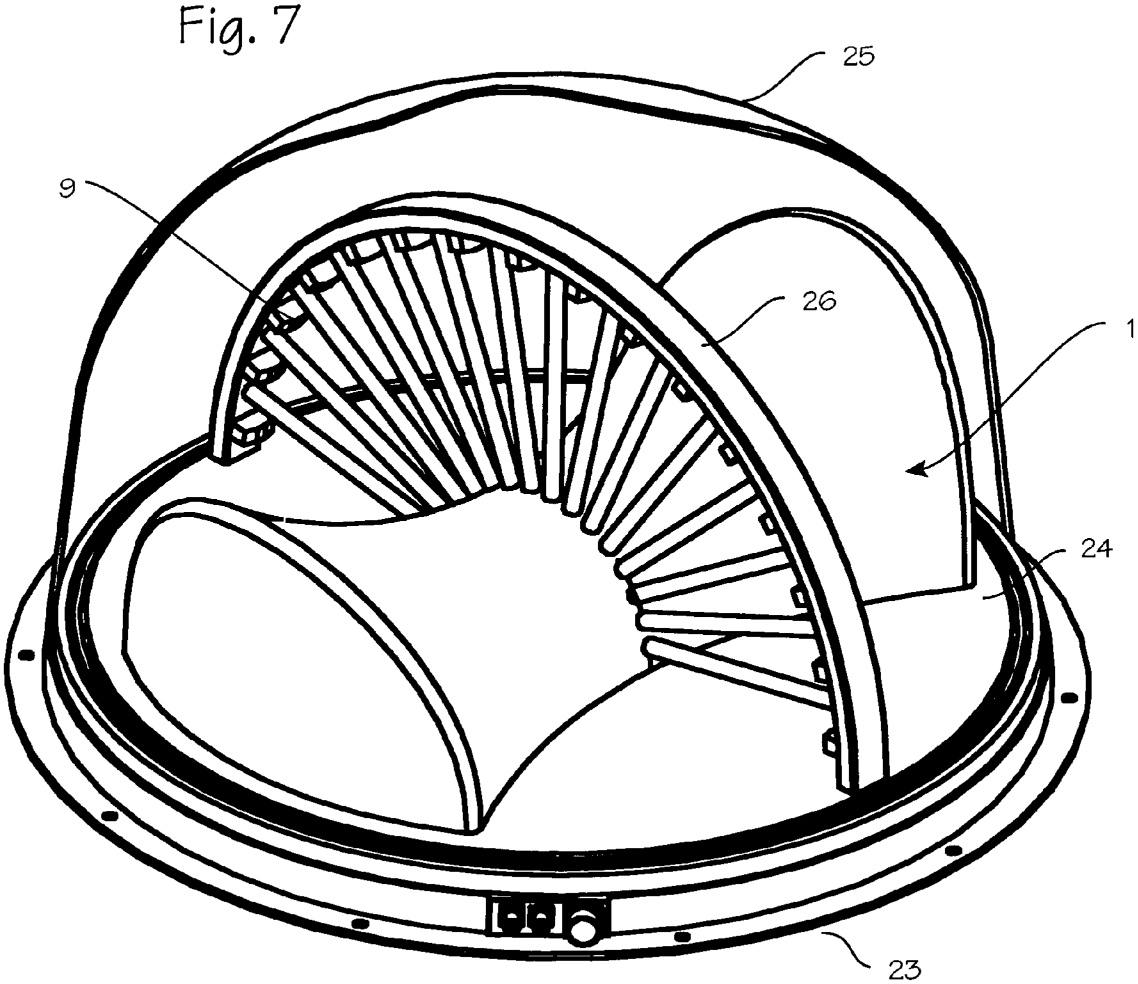
FIG. 7 shows the reflector and feed array mounted on a turntable to provide a direction finding antenna system adapted to provide azimuth and elevation localization.

The reflector is surrounded by circular arrays 7 and 8 of feed horns 9. The feed horns are located at the focal point of the vertical or elevational cross-section, at the elevation-plane focal distance. The feed horns may be held in place on a disk, as shown in FIG. 1, or on a ring suspended around the reflector as shown in FIG. 7, or they may be fixed on a radome housing placed around the reflector. Where the full height reflector is used, as in FIG. 1, one circular array is provided to collect signals from the upper section of the reflector and a second circular array is provided to collect signals from the lower section. The upper portion of the reflector and array assembly provides above-the-horizon coverage while the lower portion of the array provides below-the-horizon coverage. In applications requiring only above the horizon coverage, the system is provided without the lower assembly, as shown in FIG. 2.

Figure 4A:
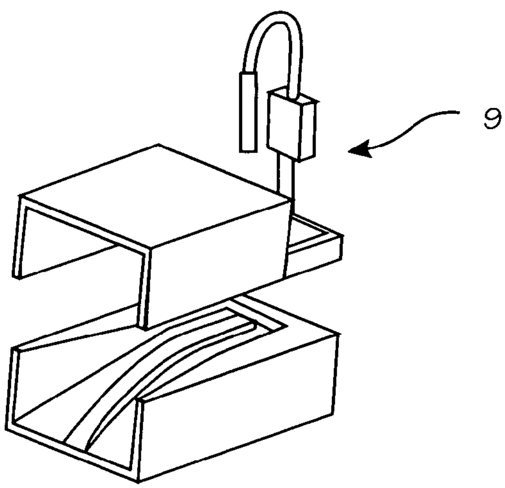
FIGS. 4*a* and 4*b* illustrate a feed horns adapted for use with the reflector.
Figure 4B:
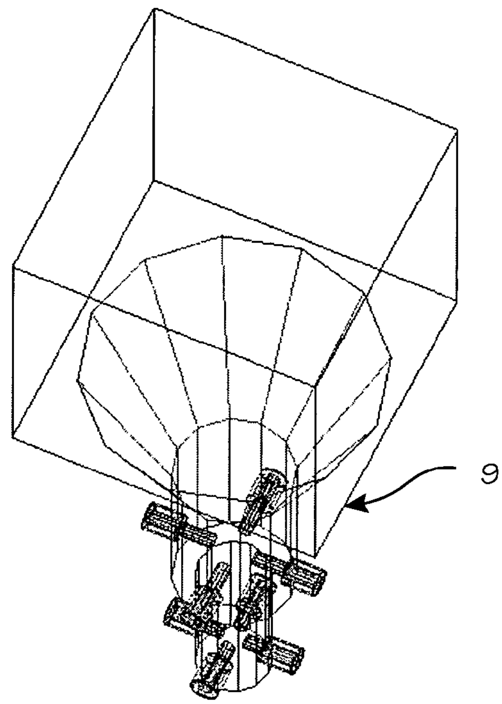

A suitable horn for use with the system of FIG. 1 is illustrated in FIG. 4*a*. The horn is a dual ridge horn with a wide beam width and wide bandwidth. FIG. 4*b* illustrates a feed horn suitable for transmission and reception of RF signals when used in conjunction with the reflector. This is a dual-concentric circular waveguide feed with the receive (low band) feed disposed coaxially with the transmit (high band) feed. Each individual feed has its diameter cut to accommodate the $TE_{1,1}$ circular waveguide mode.

The horns 9 are operated as a phased array to obtain direction information using a combination of the sum-difference and sum—sum methods. Gain and phase characteristics of the signal are obtained by accessing gain and phase information from adjacent sets of feeds. The feeds are scanned continuously, to effect an electronically spinning direction finding system, and scanning may therefore be accomplished at extreme rotational speeds compared to mechanical scanning direction finding antennas. Scanning may be performed in a circular rotation or a back-and-forth sweeping pattern to obtain precise localization of signal origin in the azimuth or horizontal plane (which corresponds to the plane established by the feed horn array, or parallel planes). Localization to accuracies within 0.6° in azimuth can be accomplished around the entire arc of the reflector and feed array.

Figure 5:
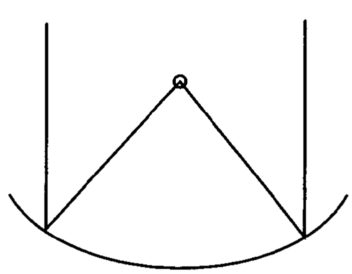
FIGS. 5 and 6 illustrate the adjustment of reflector shape which provides for localization of RF signals in elevation.
Figure 6:
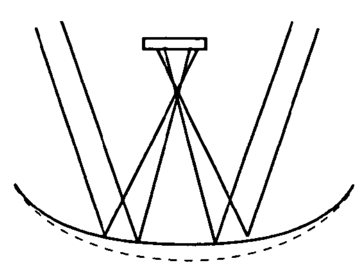

Localization of elevation (perpendicular to the beam plane) can be accomplished for an arc of about ±7° from the azimuth (the plane of the feed array) by dithering. The dithering approach involves two design aspects acting in concert with one another. First, as illustrated in FIGS. 5 and 6, the reflector vertical cross section is modified from the perfect parabolic shape which provides a point of focus (which, in the paraboloid of revolution, would provide a circle of focus) to create an imperfect parabolic shape which spreads the focus of the beam along a line extending above and below the ideal focus point (which, in the paraboloid of revolution created from revolution of an imperfect parabolic section about the longitudinal axis, provides a cylindrical wall of focus). The imperfect parabola illustrated in FIG. 6 deviates from the form of a perfect parabola in that concavity is reduced, and its arc is slightly flattened relative to the perfect parabola. The deviation may be accomplished by imposing several "flat" cylindrical segments near the waste of the flared cylinder. The exact curvature is derived at by trial and error until a suitable trade off between loss of gain and suitable spread of focus. The line or wall focus of optimum gain is designed to give a scan angle of approximately +/−7 degrees without degrading the gain significantly (approximately 1.5 dB). Also, the individual feed elements provide a small amount of scanning to optimally illuminate the quasi-parabolic reflector. By scanning through the small elevational extent of the focus, the feed elements can be used to obtain localization in elevation. Thus, by modifying the parabolic vertical surface to spread the focus or defocus the reflector, at a slight loss of gain, and employing scanning feed horns, the system can be operated to perform direction finding on both the beam plane and the orthogonal plane.

The system may be configured to provide a traditional RF output, which can consist of four (4) connections, 0.5–2 GHz output, a 2–8 GHz output, an 8–18 GHz output and a combined 0.5–18 GHz output. These outputs are used in conjunction with the 14-bit azimuth change pulse (ACP output) and a single Azimuth North Pulse (ANP) to provide precise bearing of the signal or signals of interest. The system can also be configured with the Digital Receiver Processing Module (DRPM), which consists of a 4 channel broadband digital receiver that provides separate demodulated 16 bits of amplitude and 16 bits of phase data for each channel. The digital I/Q information is forwarded via a high speed data bus (100-Mbit Ethernet) to post processing nodes where it is further analyzed and processed. This capability allows for networked installation of the direction finding system, where several antenna systems are located at remote sites, with their data networked over a high-speed backbone to a central processing center.

Figure 8:
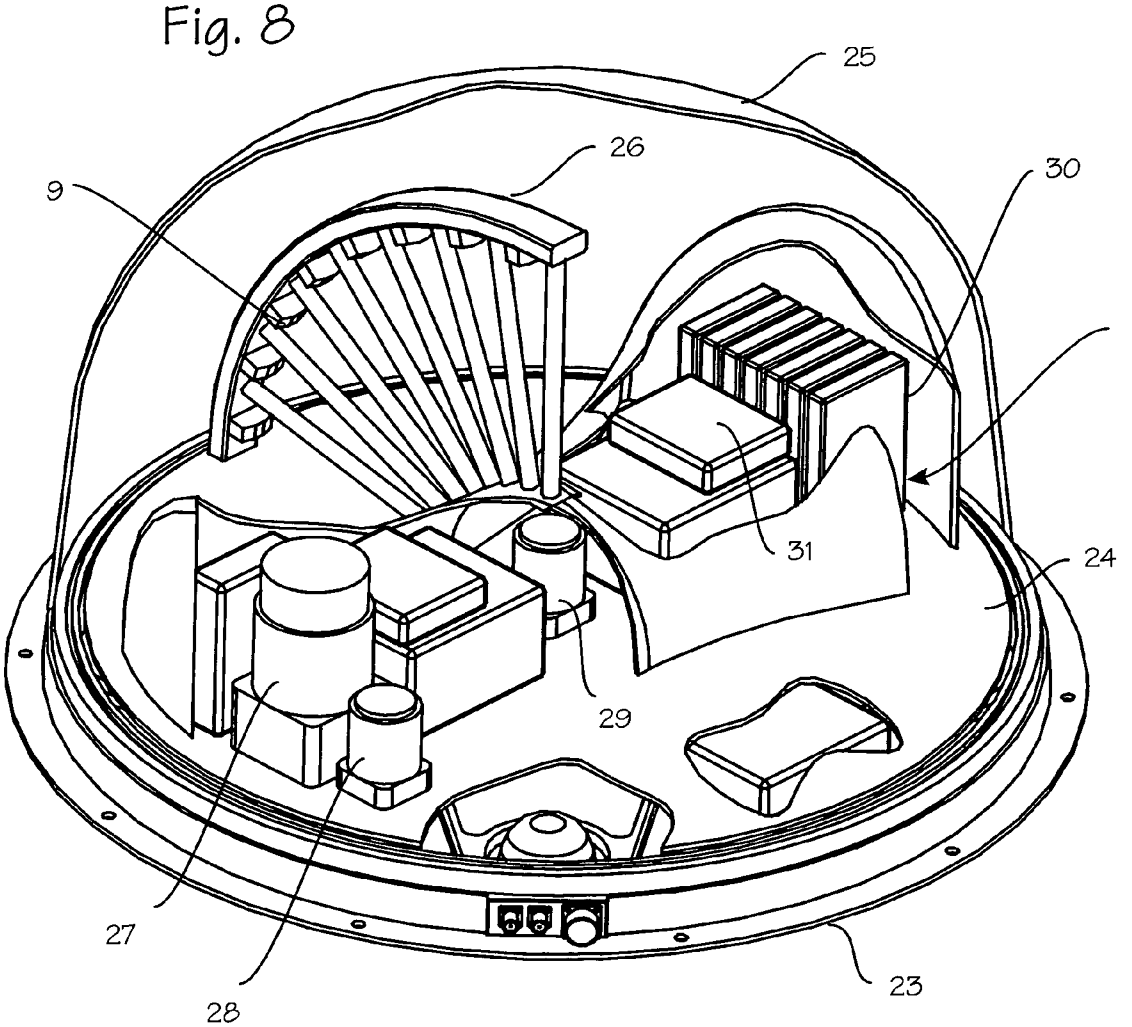
FIG. 8 is cutaway view of the system of FIG. 7.

In applications requiring localization in full azimuth and elevation, the antenna system may be mechanically rotated. FIGS. 7 and 8 show a satellite tracking system 21 with the reflector and feed array of the direction finding antenna system, adapted to provide azimuth and elevation localization. This system is adapted for satellite acquisition, tracking, and transmitting and direction finding functions. It is intended for mounting on a mobile platform (ship, military vehicle, news van, etc.). The reflector 22 is provided in full height, half-pipe configuration and is oriented horizontally, secured on a turntable 23, which in turn is mounted on a base 24. The entire assembly is covered by a radome 25. The beam plane of the reflector is aligned with the elevation plane, and the long axis of the reflector lies in the azimuth plane, so precise elevation localization may be achieved over the full arc of the sky. The feed horns 9 are disposed on the ring 26 suspended over the reflector. As illustrated in the cutaway view of FIG. 8, components such as the turntable motor 27, turntable encoder 28, power supply 29, slip ring assembly 30, and electronic systems 31 are disposed within the interior of the reflector to minimize the profile of the entire antenna assembly. An inclinometer, GPS receiver, and digital compass may also be housed within the reflector.

The signal tracking technique will be a hybrid system consisting of both Ephemeral (open loop) and Satellite Beacon (closed loop) tracking algorithms. It is assumed that the ephemeral tracking method will attain a rough degree of tracking accuracy in a moving antenna platform environment. A closed loop Satellite Beacon tracking method augments the Ephemeral tracking method to attain the optimum signal strength. The phase shifters for each feed serve a dual purpose. First they provide spatial scanning capability to beam form the circular array. Second, the phase shifters provide the ability to switch between sum and difference patterns and thus provide sum/difference channel capability.

Figure 9:
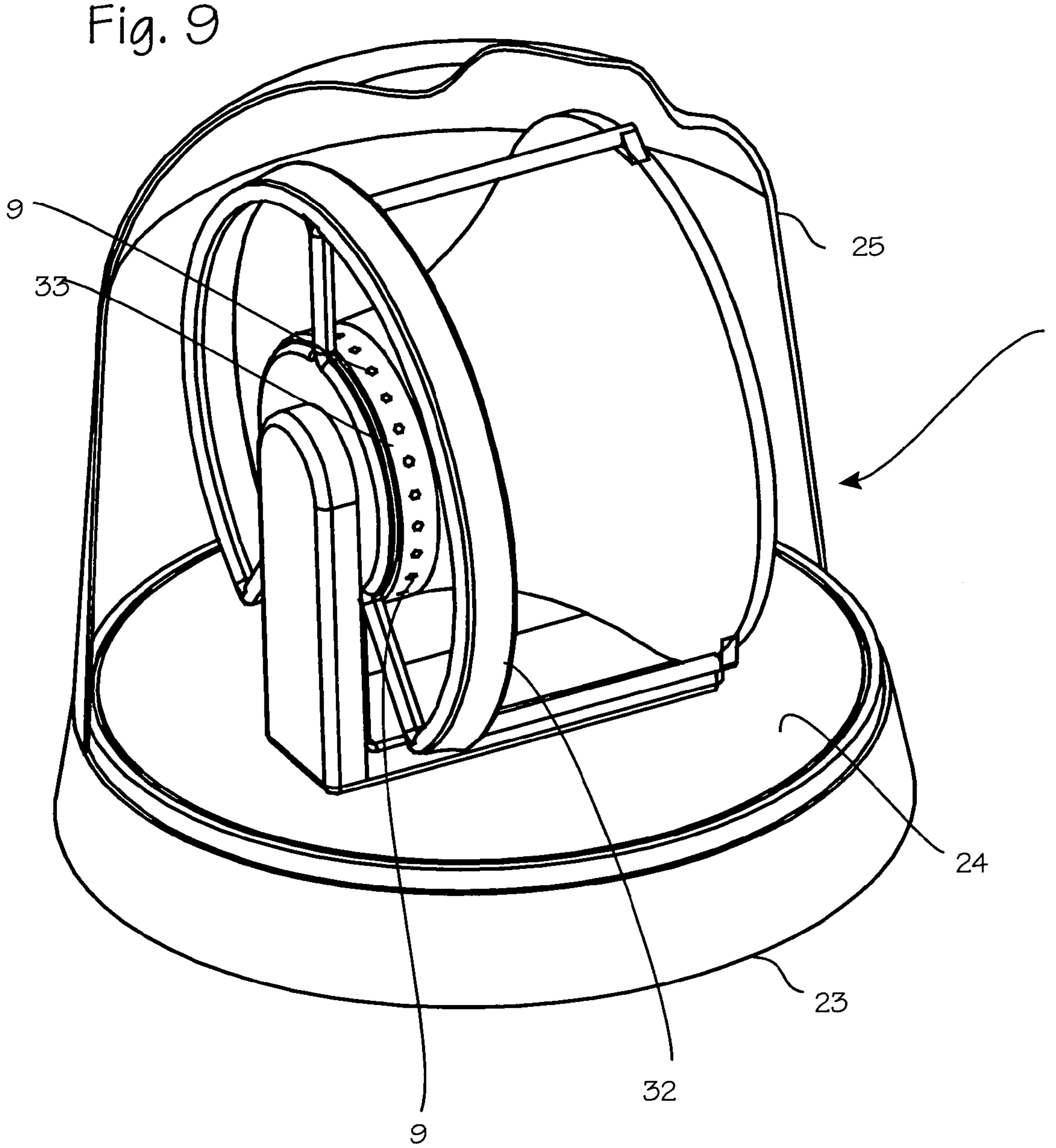
FIG. 9 shows the reflector and feed array of the direction finding antenna system, modified with the addition of an inwardly hyperboloid sub-reflector.

FIG. 9 shows the reflector and feed array of the direction finding antenna system, modified with the addition of an inwardly hyperboloid sub-reflector to form a Cassegrain antenna in revolved form. The sub-reflector 32 is disposed at the elevation focal distance from the main reflector 2. The inner surface of the sub-reflector is a hyperboloid of revolution, with a focal point or focal ring near the center of the reflector. The feed array 33 and feeds 9 are arranged in a circle, outwardly facing the hyperboloid surface of the sub-reflector 32. In this embodiment, the necessary wiring and cabling for the feeds is conveniently routed through the interior space of the main reflector 2. As with the system of FIGS. 7 and 8, this system may be rotated to locate radio frequency sources in the sky.

Figure 10:
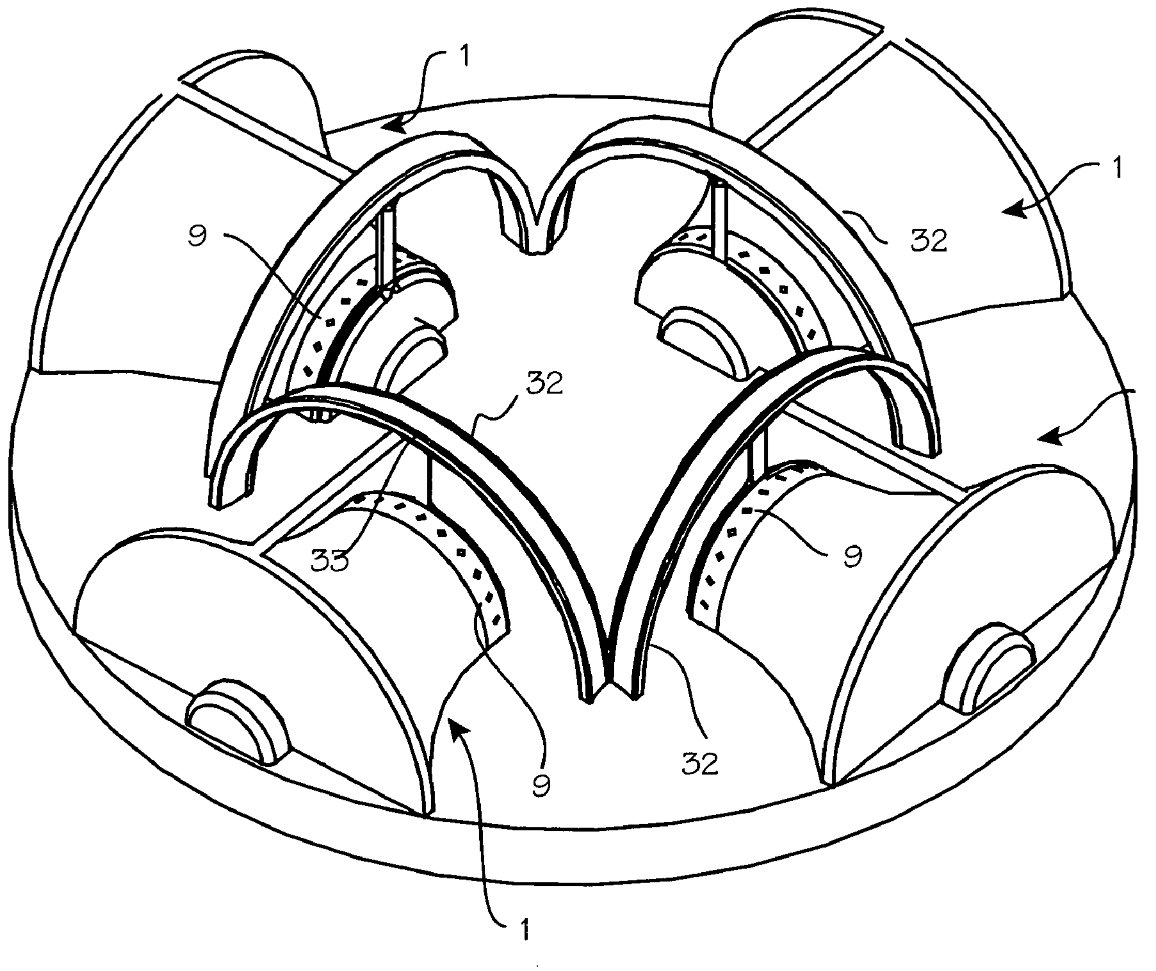
FIG. 10 shows the reflector and feed array of the direction finding antenna system, with orthogonally disposed reflector assemblies.

FIG. 10 shows the reflector and feed array of the direction finding antenna system, with orthogonally disposed reflector assemblies. This provides orthogonal beam planes, and signals from reflectors on both axes can be processed to provide precise azimuth and elevation localization without any moving parts. The system comprises four semi-cylindrical singly flared cylinder reflectors 34 arranged at right angles to each other. A semicircular array 35 of feed horns 9 are arranged in a circle, outwardly facing the hyperboloid reflectors 36 disposed in the focal plane of each reflector, at the elevation focal distance of each reflector.

Figure 11:
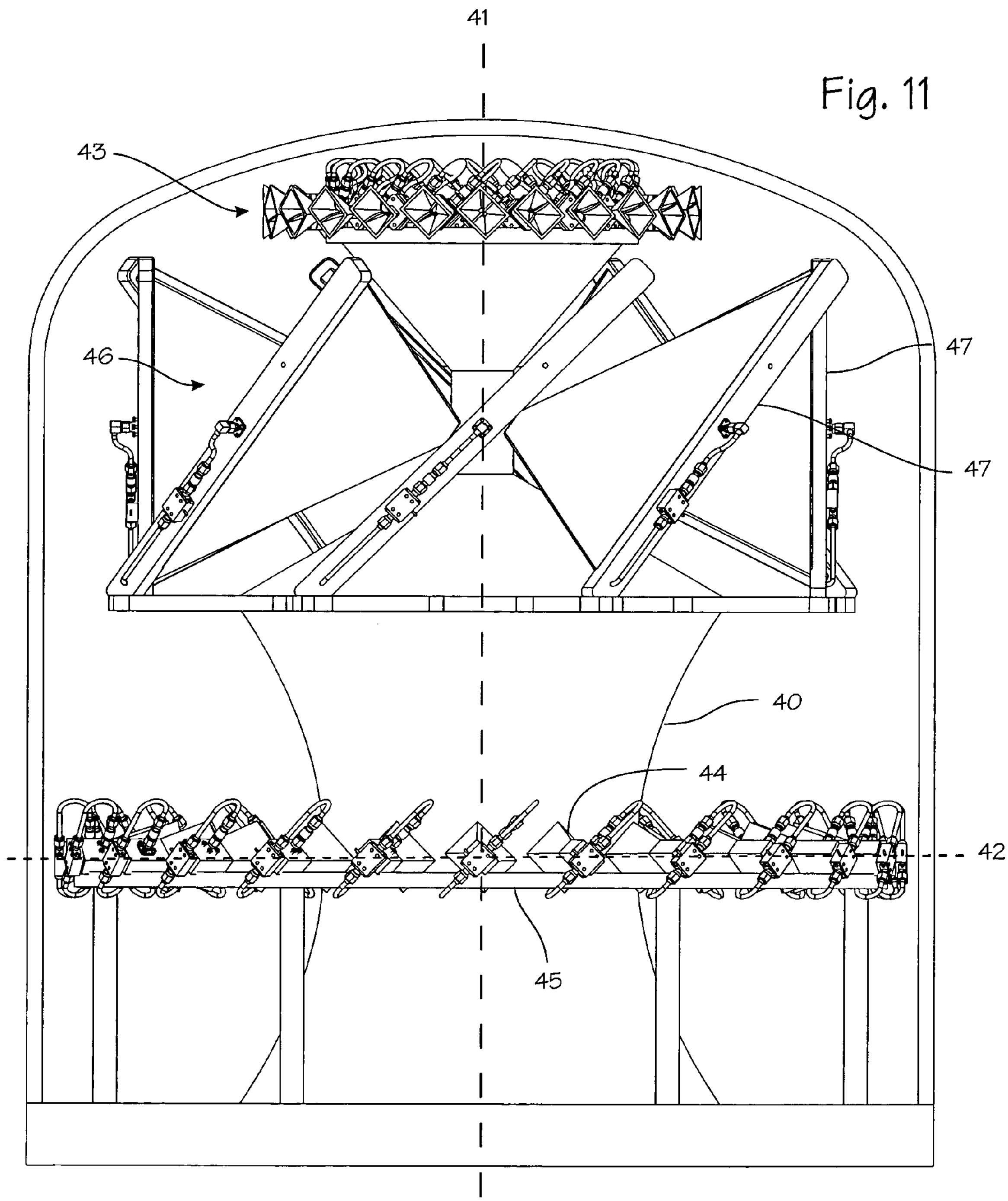
FIGS. 11 and 12 show the reflector and feed array of the prior Figures paired with broadband log periodic active feed arrays.
Figure 12:
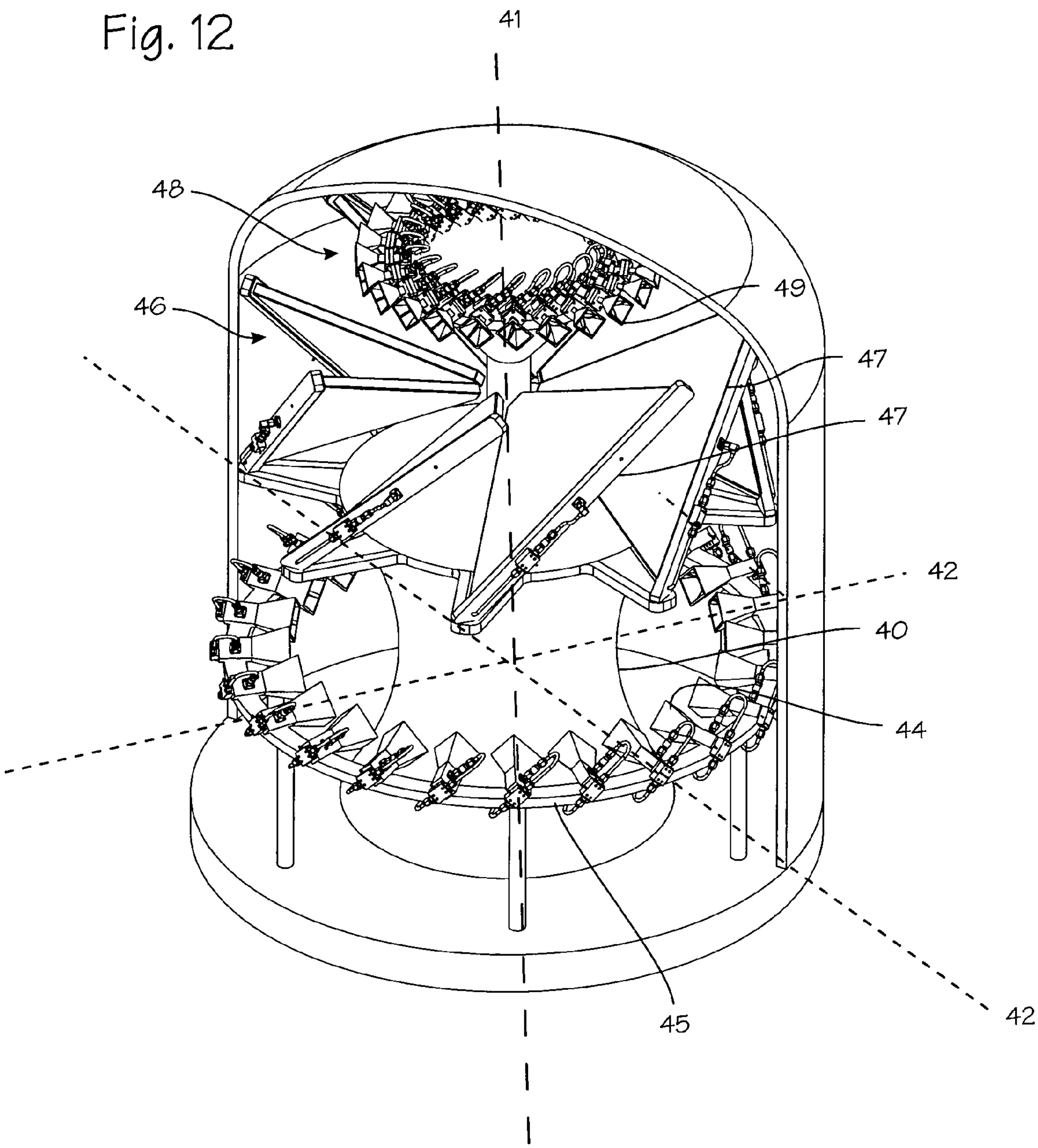

FIGS. 11 and 12 show the reflector and feed array of the prior Figures paired with a low frequency broadband log periodic active feed array and a high frequency dual ridged horn array. In this embodiment, the reflector 40 comprises a doubly flared cylindrical reflector surface, which establishes an elevational axis 41 and an azimuth plane 42.

The reflector 40 is surrounded by a circular array 43 of feed horns 44. The feed horns are located at the focal point of the vertical or elevational cross-section, at the elevation-plane focal distance. The feed horns are held in place on the ring 45 suspended around the reflector, and are oriented inwardly toward the reflector. Each feed horn is also rotated 45° about the radial vector (or, equivalently, the azimuth angle) about which it is aligned to face the reflector. Twenty four feed horns, operating in a frequency range of 6 to 18 GHz, are used in this embodiment, to provide mid-range input and output relative to the remaining arrays.

A low frequency broadband log periodic active feed array 46 is disposed above the flared cylindrical reflector, and is coaxial with the flared cylindrical reflector. This array comprises eight high gain, low frequency, log periodic antenna feeds 47 arranged in a circular array (though any number of antennae may be used) in a plane parallel to the beam plane of the flared cylindrical reflector. (The log periodic antenna is also referred to as a log periodic array, as it comprises a number of individual antennae dipoles.) Each log periodic antenna is disposed about a central hub, extending radially from the hub, and is inclined relative the to the plane established by the overall array, which establishes the beam plane of this array (this plane is perpendicular to the axis of the hub and the long axis of the cylindrical reflector). The log periodic feeds of array 46 are configured to maintain a substantially constant electrical spacing between the active regions of the log periodics, to reduce the level of side lobe radiation and improve the main beam gain. To maintain the low profile of the assembly, the low frequency element of each LP antenna is folded and end loaded. The antennae of feed array 46 are adapted to operate in a frequency range of about 0.5 to 6.0 GHz.

A high frequency ridged horn active feed array 48 is disposed above the low frequency feed array 46, and is coaxial with both the flared cylindrical reflector and the low frequency feed array. This array comprises twenty-four high gain dual ridged horn antenna feeds 49 arranged in a circular array (though any number of antennae may be used), outwardly directed, in a plane parallel to the beam plane of the flared cylindrical reflector. Each feed horn is rotated 45° about its horizontal axis, or the radial vector (or, equivalently, the azimuth angle) about which it is aligned. The antennae of feed array 48 are adapted to operate in a frequency range of about 18 to 40 GHz.

The ESDF antenna assembly contains three independent Beam Forming and Switching Matrix assemblies associated with the Low, Mid and High Frequency bands and, correspondingly, the A low frequency log periodic active feed array 46, the flared cylindrical reflector array 40 and 43, and the high frequency ridged horn active feed array 48. The beam forming and switching matrix is designed to provide a high angular resolution movement of each of the Sum and Difference beams for each of the operating frequency bands. The angular resolution is controlled by the antenna control unit via a lookup table and is setup in 0.3° steps, which provides for a precise and incremental angular movement of the beam. Beam Forming beams coexist with Sector Scan beams in the ESDF system.

The ESDF system contains three independent sector scanning and switching matrix assemblies associated with each of the Low, Mid and High Frequency bands. The sector scanning and switching matrix provides direct output of each selected feed. These independent channels provide coarse angular resolution movement of the beams for each of the operating frequency bands. The angular resolution is controlled by the ACU via a lookup table and is setup in software. The sector scanning beams can be switched on and off at high speeds (up to 0.1 usec.), and thus provide for a high rate of rotation (up to 25000 RPM). In addition, the sector scanning beams are truly broadband (0.5–6, 6–18 and 18–40 GHz) and offer high gain outputs spanning the frequency range of each of the three bands (see table 1 for gain values).

Sector scanning beams can be used in the initial acquisition mode where the beams can be used to provide a resultant synthetic High Gain Omni Channel. This capability is achieved by switching beams at very high speed, effectively providing a near continuous coverage. It should be noted that ESDF provides for simultaneous operation and acquisition of each of the bands in addition to simultaneous operation in the beam-forming mode.

The ESDF contains a built in antenna control unit, which is contains the processing algorithms for the beam forming and sector scanning subsystems. The ACU is the interface between the ESDF antenna system and the operator, and has a primary function of verifying the validity of input data and commands, and processing this data to control various antenna interface functions. The data and commands may be in the form of communication over a communications interface. Entered data is checked for validity by a microprocessor and processed to cause mode/status changes or positioning commands.

Manual control of the ESDF may be accomplished using a personal computer or similar computer input terminal and an associated display, through an Ethernet interface between the ESDF microprocessor and the computer input terminal. Necessary monitors and displays may be provided with the system, but preferably the system is implemented through a user-provided computer system with software provided by the manufacturer of the ESDF.

Figure 13:
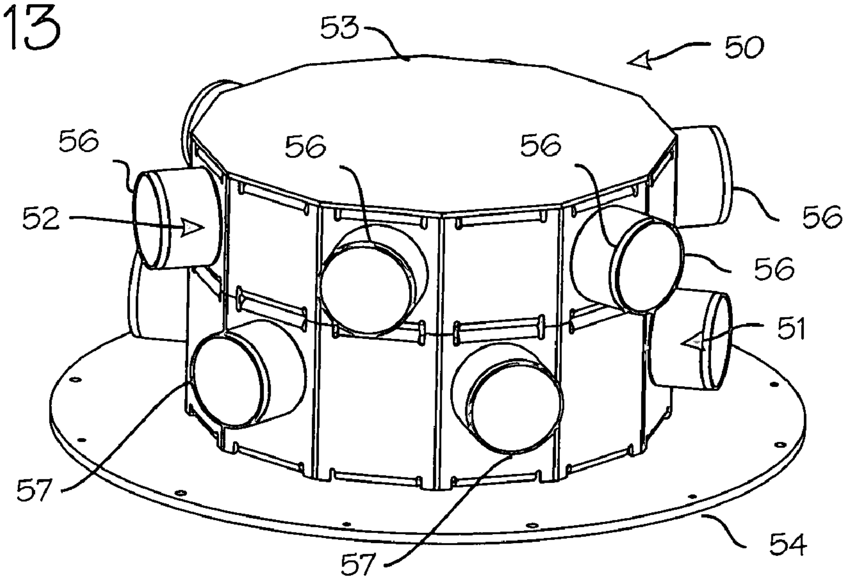
FIGS. 13 and 14 show a cylindrical array of antennas in an electronically scanning direction finding system.
Figure 14:
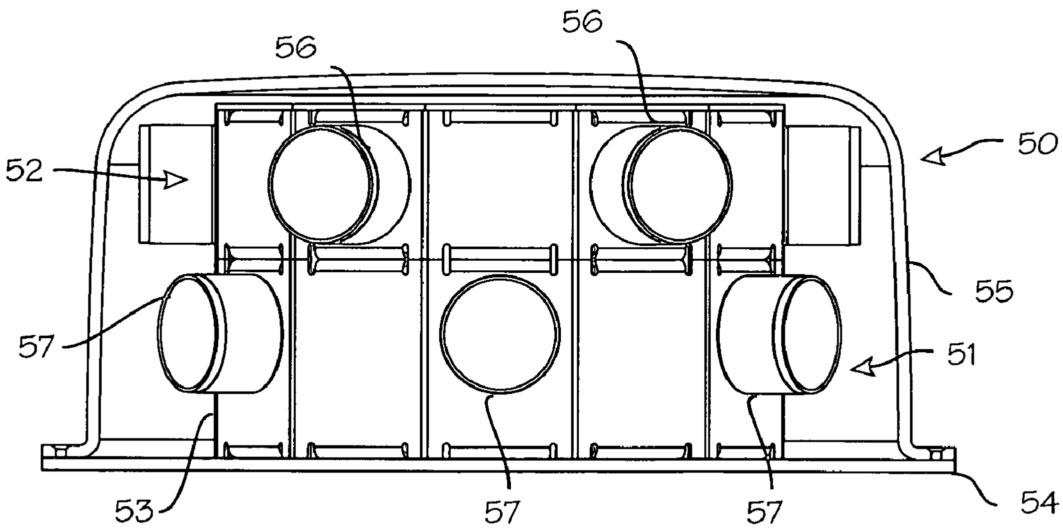

FIGS. 13 and 14 show a cylindrical array 50 in an electronically scanning direction finding system. This ESDF antenna system consists of a number of antennae arranged in circular arrays 51 and 52, and stacked together to form a cylindrical array. The individual antennae are supported within cylindrical housing 53 which in turn is mounted on a base plate 54. The entire antenna assembly is surrounded by a single radome 55. The circular array 51 comprises a plurality of broadband planar cavity backed spiral active feed antennae 56 adapted to operate in the frequency range of about 2–18 GHz. The antennae comprise planar cavity spirals that are circularly polarized, either Right or Left Hand (RHCP or LHCP). These antennas are frequency independent and have excellent unit-to-unit performance. The planar cavity backed spirals feeds are designed to provide optimum illumination of the 2–18 GHz band.

The circular array 52 comprises a plurality of broadband planar cavity backed spiral active feed antennae 57. The planar cavity backed spirals feeds of this array are also designed to provide optimum illumination of the 2–18 GHz band. This array is disposed coaxially with the circular array 51, but is rotated to place the antennae of the upper array into angular offset relationship with the antennae of the lower array. The antennae are operated as a phased array, with the output of each antenna being fed to processor which compares the output of antenna in the upper array with output of antenna in the lower array to determine the originating direction of incoming radio signals.

The ESDF system described above may be modified is several aspects. The ridged horn antennae may be replaced with any form of highly directional GHz range antennae, such as log periodic arrays, spiral arrays. The log periodic antennae may be replaced with other antenna operable at the lower end of the GHZ range, such as horns and spirals. Thus, while the preferred embodiments of the devices and methods have been described in reference to the environment in which they were developed, they are merely illustrative of the principles of the inventions. Other embodiments and configurations may be devised without departing from the spirit of the inventions and the scope of the appended claims.

We claim:

1. A radio frequency direction finding antenna system comprising:

an antenna and reflector assembly comprising:

a reflector comprising a cylinder, said reflector having a longitudinal axis, said reflector establishing a beam plane substantially perpendicular to the longitudinal axis;

a first array of feed horns comprising a plurality of feed horns arranged in an arc around the cylinder, directed inwardly toward the cylinder, said array disposed in proximity to the beam plane, said feed horns being operable to receive radio frequency energy reflected from the cylinder within a first predetermined frequency range.

2. A radio frequency direction finding antenna system of claim 1 further comprising:

an antenna array comprising a plurality of log periodic antennae arranged in an arc, said arc being substantially coaxial with the reflector, said antenna array being located in proximity to the antenna and reflector assembly, said log periodic antennae being operable to receive radio frequency energy incident thereon within a second predetermined frequency range.

3. A radio frequency direction finding antenna system of claim 2 further comprising:

an antenna array comprising a plurality of feed horns arranged in an arc, said arc being substantially coaxial with the reflector, said antenna array being located in proximity to the antenna and reflector assembly, said feed horns being operable to receive radio frequency energy incident thereon within a third predetermined frequency range.

4. A radio frequency direction finding antenna system of claim 3 wherein:

the first predetermined frequency range is about 6 to 18 Ghz;

the second predetermined frequency range is about 0.5 to 6 Ghz; and the third predetermined frequency range is about 18 to 40 GHz.

5. The radio frequency direction finding antenna system of claim 1 wherein the reflector is a semi-cylinder.

6. The radio frequency direction finding antenna system of claim 1 wherein the reflector is a full cylinder which is flared at least one end.

7. The radio frequency direction finding antenna system of claim 1 wherein the reflector is a semi-cylinder which is flared at least one end.

8. The radio frequency direction finding antenna system of claim 1 wherein an outer surface of the cylindrical section is defined by a surface of revolution of a parabolic section about the longitudinal axis.

9. The radio frequency direction finding antenna system of claim 1 wherein the cylindrical section is a full cylinder which is flared each end thereof, and the first array is a circular array disposed coaxially with the cylinder.

10. The radio frequency direction finding antenna system of claim 1 wherein the cylindrical section is a semi-cylinder which is flared at each end thereof, and the first array is a semi-circular array disposed coaxially with the semi-cylinder.

11. A radio frequency direction finding antenna system comprising:

an antenna and reflector assembly comprising:

a reflector comprising a flared cylinder, said reflector having a longitudinal axis, said reflector establishing a beam plane substantially perpendicular to the longitudinal axis;

a first array of feed horns comprising a plurality of feed horns arranged in an arc around the cylinder, directed inwardly toward the flared cylinder, said array disposed in proximity to the beam plane, said feed horns being operable to receive radio frequency energy reflected from the flared cylinder within a first predetermined frequency range.

12. A radio frequency direction finding antenna system of claim 11 further comprising:

an antenna array comprising a plurality of log periodic antennae arranged in an arc, said arc being substantially coaxial with the reflector, said antenna array being located in proximity to the antenna and reflector assembly, said log periodic antennae being operable to receive radio frequency energy incident thereon within a second predetermined frequency range.

13. A radio frequency direction finding antenna system of claim 12 further comprising:

an antenna array comprising a plurality of feed horns arranged in an arc, said arc being substantially coaxial with the reflector, said antenna array being located in proximity to the antenna and reflector assembly, said feed horns being operable to receive radio frequency energy incident thereon within a third predetermined frequency range.

14. A radio frequency direction finding antenna system of claim 13 wherein:

the first predetermined frequency range is about 6 to 18 Ghz;

the second predetermined frequency range is about 0.5 to 6 Ghz; and the third predetermined frequency range is about 18 to 40 GHz.

15. The radio frequency direction finding antenna system of claim 11 wherein the reflector is a semi-cylinder.

16. The radio frequency direction finding antenna system of claim 11 wherein the flared cylinder is a full cylinder.

17. The radio frequency direction finding antenna system of claim 11 wherein an outer surface of the flared cylinder is defined by a surface of revolution of a parabolic section about the longitudinal axis.

18. The radio frequency direction finding antenna system of claim 11 wherein the flared cylinder is a full cylinder which is flared at each end thereof, and the first array is a circular array disposed coaxially with the cylinder.

19. The radio frequency direction finding antenna system of claim 11 wherein the flared cylinder is a semi-cylinder which is flared at each end thereof, and the first array is a semi-circular array disposed coaxially with the semi-cylinder.

20. The radio frequency direction finding antenna system of claim 11 wherein an outer surface of the flared cylinder is defined by a surface of revolution of an imperfect parabolic section about the longitudinal axis.

21. A radio frequency direction finding antenna system comprising:

an antenna and reflector assembly comprising:

a reflector comprising a cylindrical section, said reflector having a longitudinal axis, said reflector establishing a beam plane substantially perpendicular to the longitudinal axis;

a first array of feed horns comprising a plurality of feed horns arranged in an arc around the reflector, directed inwardly toward the reflector, said array disposed in proximity to the beam plane, said feed horns being operable to receive radio frequency energy reflected from the reflector within a first predetermined frequency range.

22. A radio frequency direction finding antenna system of claim 21 further comprising:

an antenna array comprising a plurality of log periodic antennae arranged in an arc, said arc being substantially coaxial with longitudinal axis of the reflector, said antenna array being located in proximity to the antenna and reflector assembly, said log periodic antennae being operable to receive radio frequency energy incident thereon within a second predetermined frequency range.

23. A radio frequency direction finding antenna system of claim 22 further comprising:

an antenna array comprising a plurality of feed horns arranged in an arc, said arc being substantially coaxial with the longitudinal axis of the reflector, said antenna array being located in proximity to the antenna and reflector assembly, said feed horns being operable to receive radio frequency energy incident thereon within a third predetermined frequency range.

24. A radio frequency direction finding antenna system of claim 23 wherein:

the first predetermined frequency range is about 6 to 18 Ghz;

the second predetermined frequency range is about 0.5 to 6 Ghz; and the third predetermined frequency range is about 18 to 40 GHz.

25. The radio frequency direction finding antenna system of claim 21 wherein the cylindrical section is a semi-cylinder.

26. The radio frequency direction finding antenna system of claim 21 wherein the reflector is a full cylinder which is flared at least one end.

27. The radio frequency direction finding antenna system of claim 21 wherein the cylindrical section is a semi-cylinder which is flared at least one end.

28. The radio frequency direction finding antenna system of claim 21 wherein an outer surface of the cylindrical section is defined by a surface of revolution of a parabolic section about the longitudinal axis.

29. The radio frequency direction finding antenna system of claim 21 wherein the cylindrical section is a full cylinder which is flared each end thereof, and the first array is a circular array disposed coaxially with the cylinder.

30. The radio frequency direction finding antenna system of claim 21 wherein the cylindrical section is a semi-cylinder which is flared at each end thereof, and the first array is a semi-circular array disposed coaxially with the semi-cylinder.

* * * * *